Figure 1:
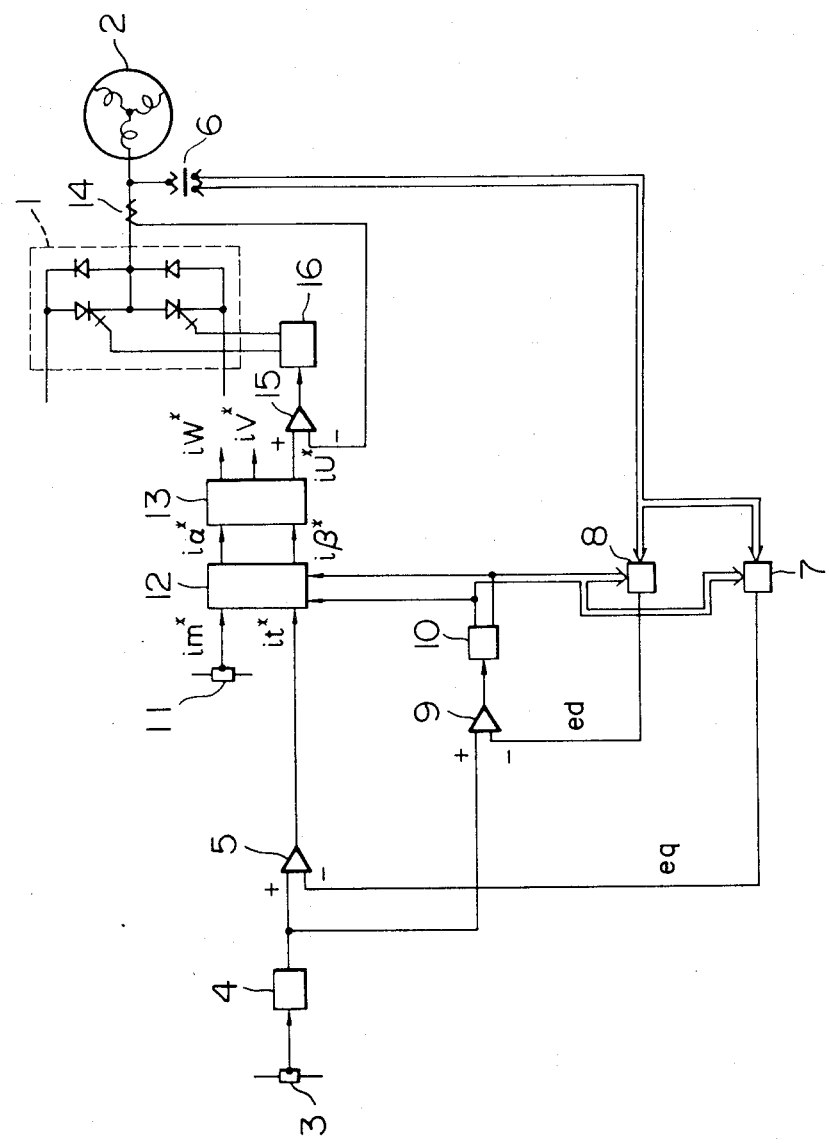

United States Patent [19]

Okuyama

[11] Patent Number: 4,503,376

[45] Date of Patent: Mar. 5, 1985

[54] CONTROL METHOD FOR INDUCTION MOTORS

[75] Inventor: Toshiaki Okuyama, Ibaraki, Japan

[73] Assignee: Hitachi, Ltd., Tokyo, Japan

[21] Appl. No.: 538,793

[22] Filed: Oct. 4, 1983

[30] Foreign Application Priority Data

Oct. 4, 1982 [JP] Japan .................................. 57-173184

[51] Int. Cl.$^3$ ............................................ H02P 5/40
[52] U.S. Cl. .................................... 318/802; 318/805; 318/808
[58] Field of Search ........ 318/800, 802, 803, 807–811, 318/798, 805, 806

[56] References Cited

U.S. PATENT DOCUMENTS 3,593,083  7/1971  Blaschke ............................ 318/803
3,904,942  9/1975  Holtz .................................. 318/687
4,338,559  7/1982  Blaschke et al. .................. 318/807
4,451,771  5/1984  Nagase et al. ..................... 318/803
4,459,534  7/1984  Nagase et al. ..................... 318/803

Primary Examiner—David Smith, Jr.
Attorney, Agent, or Firm—Antonelli, Terry & Wands

[57] ABSTRACT

A quick response vector control method which is one of methods for controlling a speed of an induction motors without a speed detector; in which a voltage of the motor is detected to resolve into a vector component $e_d$ parallel with an exciting current component vector of a primary current and a vector component $e_q$ orthogonal to said exciting current component vector, and a frequency of the primary current is controlled to maintain the vector component $e_d$ at zero, while at the same time the primary current is controlled corresponding to a difference between the vector component $e_q$ and the speed command signal.

4 Claims, 10 Drawing Figures (a)

(b)

(c)

(a)

(b)

CONTROL METHOD FOR INDUCTION MOTORS

The present invention relates to a control method for induction motors with a quick speed response in the speed control for the induction motors.

A vector control method using a frequency converter has been known as one of the speed control methods for the induction motor featured by a high accuracy and high speed response. In this method, the primary current of the induction motor is resolved into a torque current component and an exciting current component. In the motor speed control, these components are independently controlled, thus ensuring a high speed response in the motor speed control, which is comparable with that in the case of a DC motor. The conventional motor speed control system is based on a slip frequency control scheme, and actually a slip frequency of the motor and the amplitude and phase of the motor current. Therefore, the conventional speed control method requires a speed detected signal (or a rotating angle detected signal) in controlling the output frequency of the frequency converter. This necessitates the provision of a speed detector (or a position detector) and a signal cable for the detected signal transmission. The result is that the control device is complicated in structure. A vector control method requiring no speed detector was proposed by Yoshikawa Kamiya et al. and is disclosed in Kokai 57-55781 published on Sept. 17, 1980, bearing the title "Speed Control Method for Induction Motors". This method is so arranged that a flux is obtained from the terminal voltage of the induction motor through the operating process. To this end, an integrator is needed for the flux detection. When the integrator drifts in the characteristic, the flux signal also varies to generate an error, failing to have a stable speed control. Further, this speed control method controls the frequency on the basis of an instantaneous signal of the flux. Because of this, the frequency is easy to vary due to the residual high harmonics components in the signal, leading to an instable motor speed controlling.

Accordingly, with the view of solving the problems of the prior art, an object of the invention is to provide a stable vector control method for an induction motor without an integrator providing a major cause to the instability in the induction motor speed control, and thus requiring no speed detector.

The present invention is characterized in that a terminal voltage of an induction motor is detected, the detected voltage is resolved into a component parallel to and another component orthogonal to a vector of the exciting current component, the primary frequency of the induction motor is controlled so that the component parallel to the exciting current component vector is zeroed, while at the same time an amplitude of the exciting current is controlled so that the component orthogonal to the vector is set at a set value.

Figure 3:
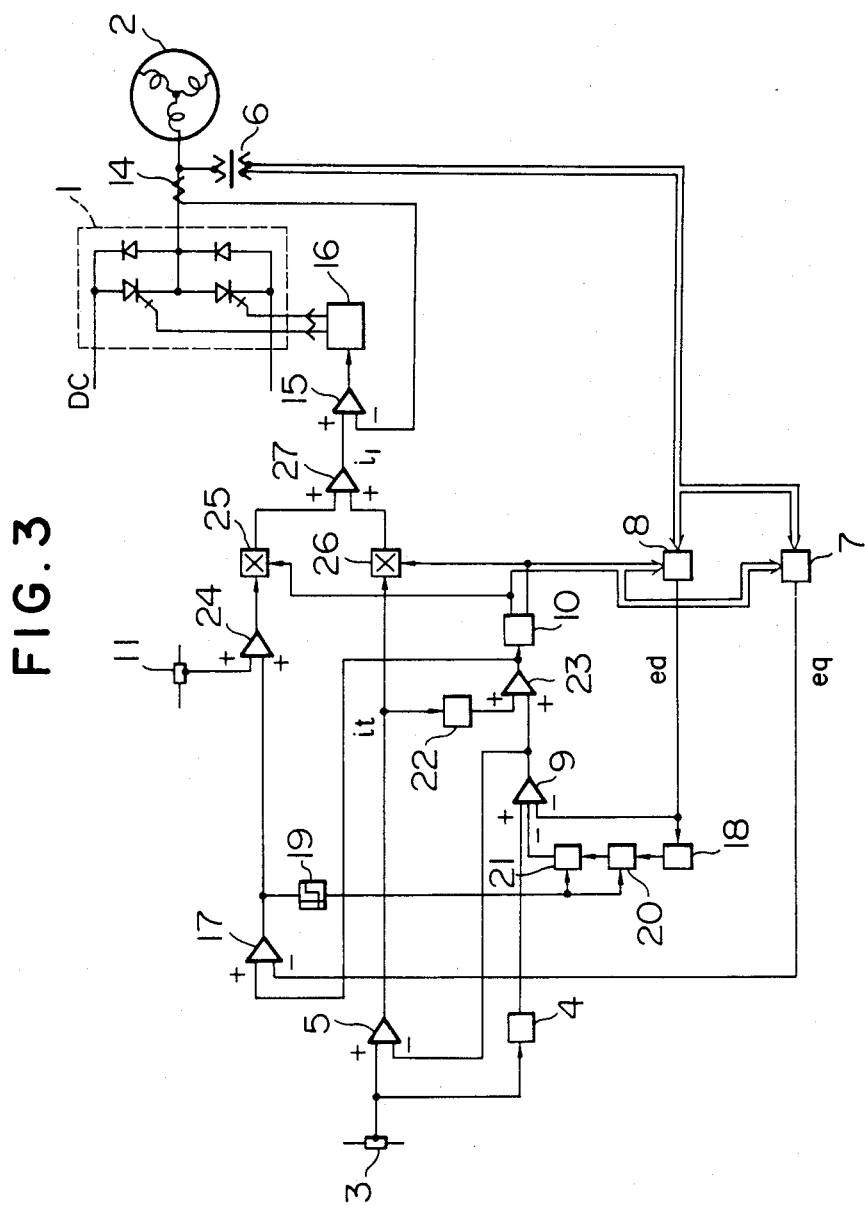
Figure 4:
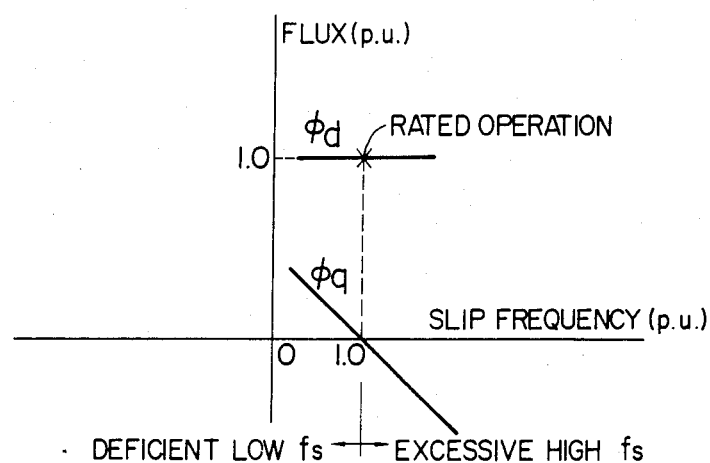
Figure 4:
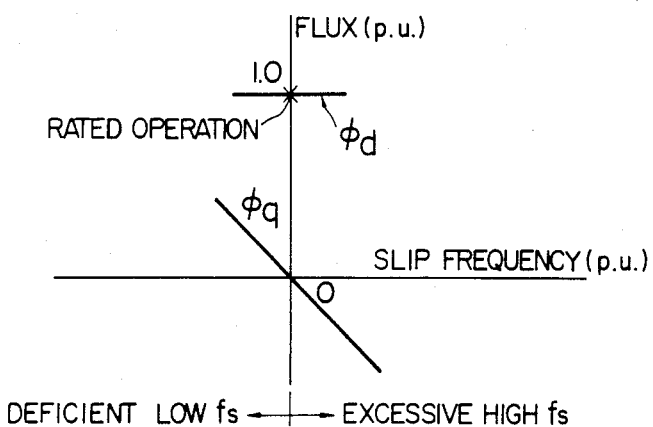
Figure 5:
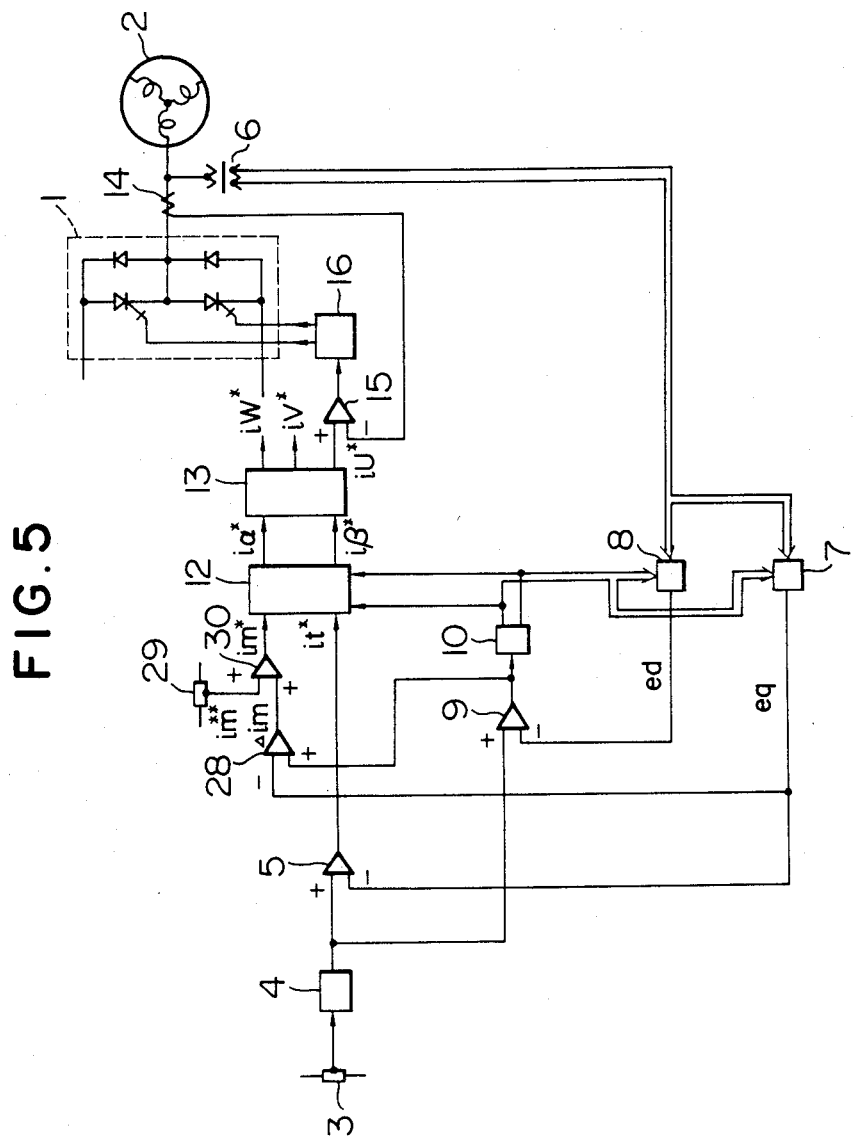
Figure 6:
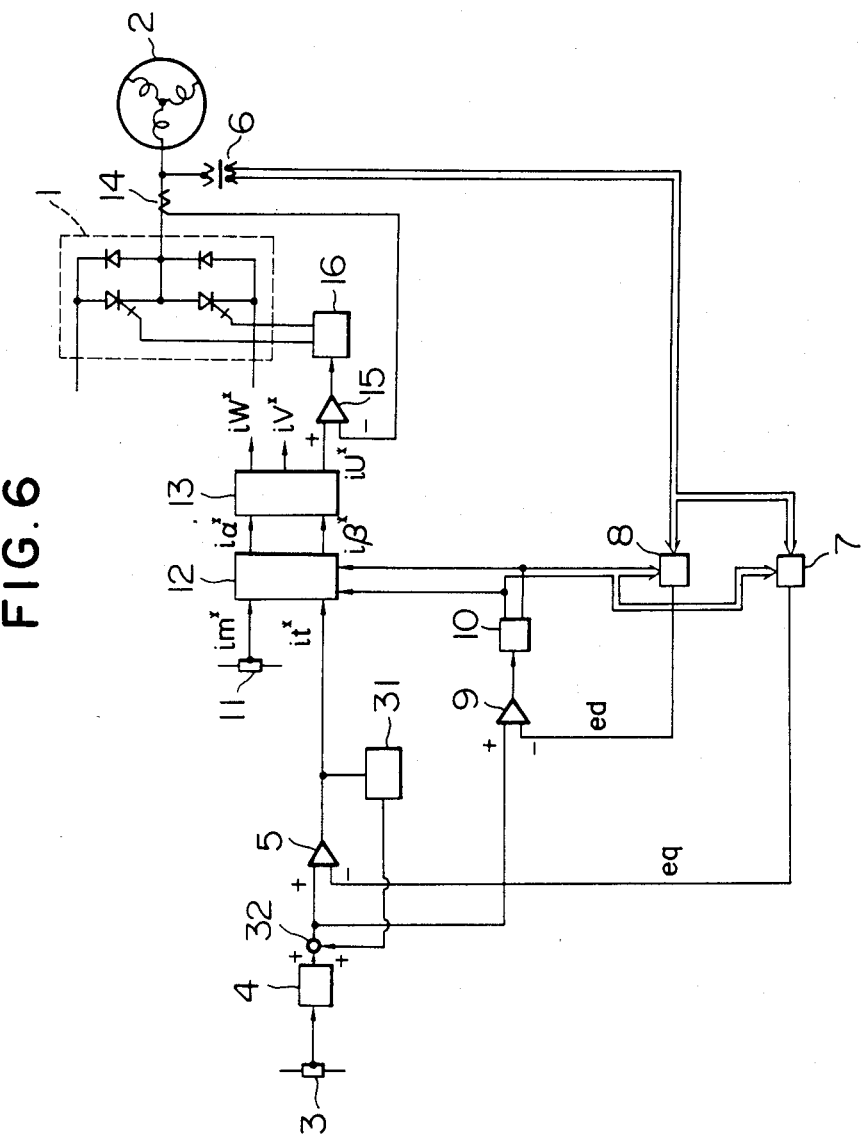
Figure 7:
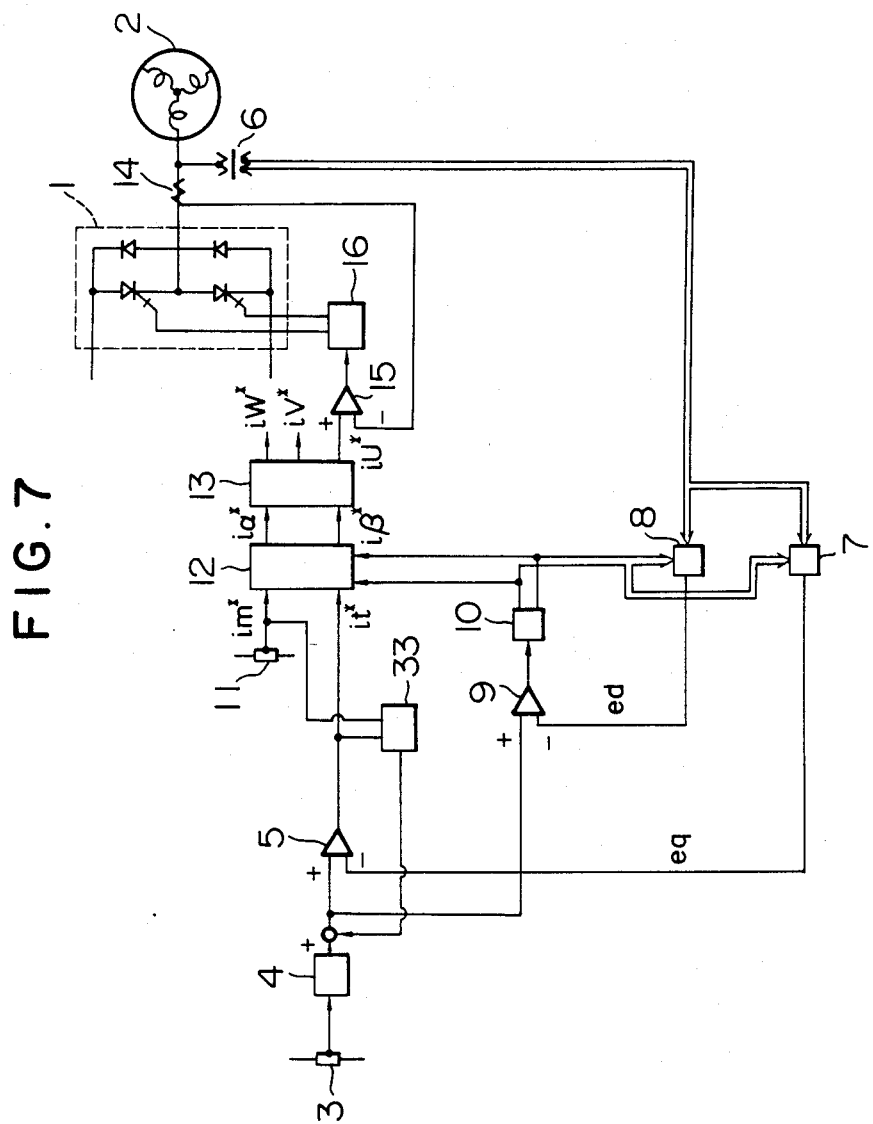

The present invention will be apparent from the following description taken in connection with the accompanying drawings, in which:

FIG. 1 illustrates a functional diagram of a speed control circuit for induction motors;

FIGS. 2(a) through 2(c) are graphical representations useful in explaining the principles of the present invention;

FIG. 3 illustrates a circuit diagram of an embodiment of the present invention;

FIGS. 4(a) and 4(b) are graphs useful in explaining the operation of the circuit of FIG. 3; and FIGS. 5 through 7 are functional diagrams of other embodiments as modifications of the circuit of FIG. 1.

Referring to FIG. 1, there is illustrated a scheme of a control circuit for induction motors which is an embodiment of the present invention. In FIG. 1, a PWM inverter 1 is composed of diodes and switching elements such as gate turn off thyristors. Reference numeral 2 designates an induction motor under speed control, and numeral 3 a speed command circuit. A change rate limiter 4 limits a rate of change of a speed command signal. A speed difference amplifier 5 amplifies a difference between the speed command signal and a signal representing a detected motor voltage to be described later. A transformer 6 detects a motor voltage. A voltage component detector 7 detects a fundamental wave component of the motor voltage which has a 90° phase shifted from an exciting current component (exciting current phase reference signal) determined in a control system. A voltage component detector 8 detects an in-phase component of the motor voltage which is in phase with the exciting current phase reference signal. An adder 9 adds together the output signals of the voltage component detector 8 and the change rate limiter 4 to provide a frequency command signal. An oscillator 10 produces two phases of sinusoidal wave signals each having a frequency proportional to the frequency command signal. An exciting current command circuit 11 provides a command of an exciting current of the motor 2. A coordinate transforming device 12 multiplies an exciting current command $i_m{}^*$ and a torque current command signal $i_t{}^*$ issued from the speed difference amplifier 5 by the output signals from the oscillator 10, and provides two phases of current command pattern signals $i_\alpha{}^*$ and $i_\beta{}^*$. A phase converter 13 produces 3-phase current command pattern signals $i_u{}^*$ to $i_w{}^*$ on the basis of the signals $i_\alpha{}^*$ and $i_\beta{}^*$. A current detector 14 detects an instantaneous value of the output current of the PWM inverter 1. A comparator 15 compares the current command pattern signal $i_u{}^*$ with the current detected signal to produce a PWM signal for turning on and off the switching elements of the PWM inverter 1. A gate circuit 16 applies a gate signal to the switching element. The current detector 14, the comparator 15 and the gate circuit 16 belong to the U-phase, but those belonging to the V- and W-phase are omitted for simplicity.

Before proceeding with the description of the control method as mentioned above, the principle of the vector control method to which the present invention is directed will be given for a better understanding of the present invention.

Assuming now that one of the axes in the orthogonal rotating magnetic field coordinates is a d axis, while the other is a q axis. On this assumption, if a d axis component $i_1 d$ and a q axis component $i_1 q$ of the primary current are controlled so as to satisfy the following relations, these current can be controlled in a manner that $i_1 d$ correspond to the exciting current $i_1 q$ to a torque generating current $i_t$ $$|i_1| = \sqrt{i_1 d^2 + i_1 q^2} \tag{1}$$

$$\omega_s = \frac{1}{T_2} \cdot \frac{i_1 q}{i_1 d} \tag{2}$$

$$\theta = \tan^{-1} \frac{i_1 q}{i_1 d} \qquad (3)$$

where $i_1$: primary current
$\psi_s$: slip angular frequency
$T_2$: secondary time constant
$\theta$: phase of the primary current for the d axis.

If an amplitude of the primary current of the motor is controlled according to the equation (1), the primary frequency of the motor is controlled so that the slip frequency satisfies the equation (2) and the phase of the primary current is controlled with relation to the equation (3), a flux $\phi$ and a torque T are respectively controlled according to the d-axis current component $i_1d$ and the q-axis current component $i_1q$. At this time, the torque T can be controlled with no time delay for the q-axis current component $i_1q$, as indicated by the following equation (4)

$$T = k\phi \, i_1 q \qquad (4)$$

where k is a proportional coefficient.

In the control method of the present invention, an induction motor voltage is detected, and the components of the orthogonal two axes in the detected voltage are obtained by the operation. An amplitude and a frequency of the output signal from a frequency converter are controlled using the voltage components. The control process is set up so as to satisfy the above control conditions.

The operation of the control circuit shown in FIG. 1, which is arranged according to the present invention, will be described in detail.

Description will first be given about the circuit operation when the primary current is controlled according to the equations (1) and (3). The oscillator 10 produces 2 phases of sinusoidal signals with a frequency proportional to the frequency command signal derived from the adder 9. These sinusoidal signals are shifted from each other by 90° phase, and denoted as cos $\omega_1 t$ and sin $\omega_1 t$, respectively. The former serves as a phase reference signal for the exciting current of the U-phase current, and the latter as a phase reference signal for the torque generating component of the U-phase current. Upon receipt of those signals, the coordinate transforming device 12 performs the following determinant to produce two phases of current command pattern signals $i_\alpha^*$ and $i_\beta^*$.

$$\begin{bmatrix} i_\alpha^* \\ i_\beta^* \end{bmatrix} = \begin{bmatrix} \cos \omega_1 t & -\sin \omega_1 t \\ \sin \omega_1 t & \cos \omega_1 t \end{bmatrix} \begin{bmatrix} i_m^* \\ i_t^* \end{bmatrix} \qquad (5)$$

where cos $\omega_1 t$ and sin $\omega_1 t$ are the output signals from the oscillator 10, respectively.

The phase-number converter 13 performs the following determinant to produce three phase current command pattern signals $i_u^*$ to $i_w^*$.

$$\begin{bmatrix} i_u^* \\ i_v^* \\ i_w^* \end{bmatrix} = \begin{bmatrix} 1 & 0 \\ -\frac{1}{2} & +\frac{\sqrt{3}}{2} \\ -\frac{1}{2} & -\frac{\sqrt{3}}{2} \end{bmatrix} \begin{bmatrix} i_\alpha^* \\ i_\beta^* \end{bmatrix} \qquad (6)$$

Here, the signals $i_u^*$ to $i_w^*$ are expressed $$\begin{aligned} i_u^* &= A \cos (\omega_1 t + \theta) \\ i_v^* &= A \cos (\omega_1 t - \tfrac{2}{3}\pi + \theta) \\ i_w^* &= A \cos (\omega_1 t + \tfrac{2}{3}\pi + \theta) \end{aligned} \qquad (7)$$

In the above equations (7), A and $\theta$ are given $$A = \sqrt{i_m^{*2} + i_t^{*2}} \qquad (8)$$

$$\theta = \tan^{-1} \frac{i_t^*}{i_m^*} \qquad (9)$$

The output current of each phase from the PWM inverter 1 is controlled, by the comparator 15, so as to be proportional to each current command pattern signal. In this way, the d-axis current component $i_1d$ is controlled to be proportional to the exciting current command signal $i_m^*$. Likewise, the q-axis current component $i_1q$ is controlled proportional to the torque current command signal $i_t^*$. The equations (1) and (3) are satisfied with the equations (8) and (9), respectively.

The operation of the circuit of FIG. 1 to satisfy the equation (2) will be described. If the equations (1) to (3) hold, the d-axis coincides with the flux axis and the following relations hold $$\begin{aligned} \phi_{2d} &= \phi_2 \\ \phi_{2q} &= 0 \end{aligned} \qquad (10)$$

where $\phi_{2d}, \phi_{2q}$: flux components of the d- and q-axis
$\phi_{2q}$: secondary flux If the primary frequency is controlled so that the flux components $\phi_{2d}$ and $\phi_{2q}$ have always predetermined values, the equation (2) is satisfied. A change of the flux can be detected as a change in voltage. Therefore, by controlling the primary frequency according to a change in voltage, we have the relation of (2).

Figure 2:
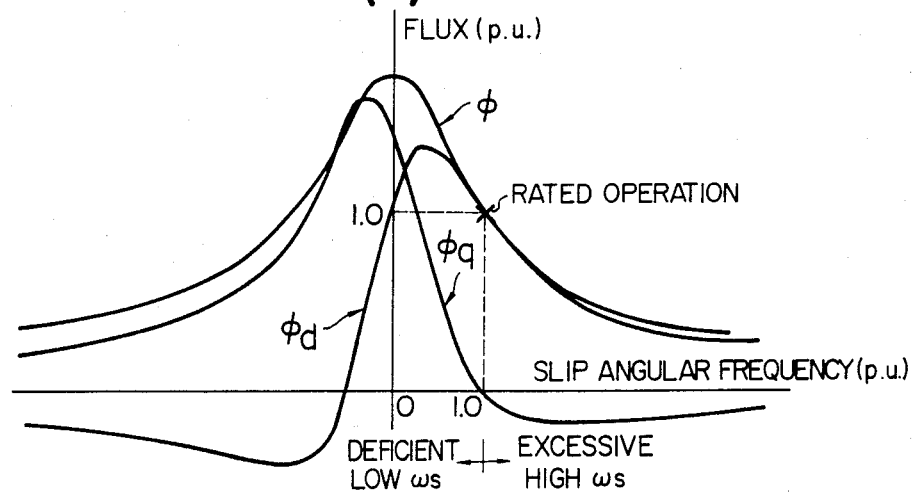
Figure 2:
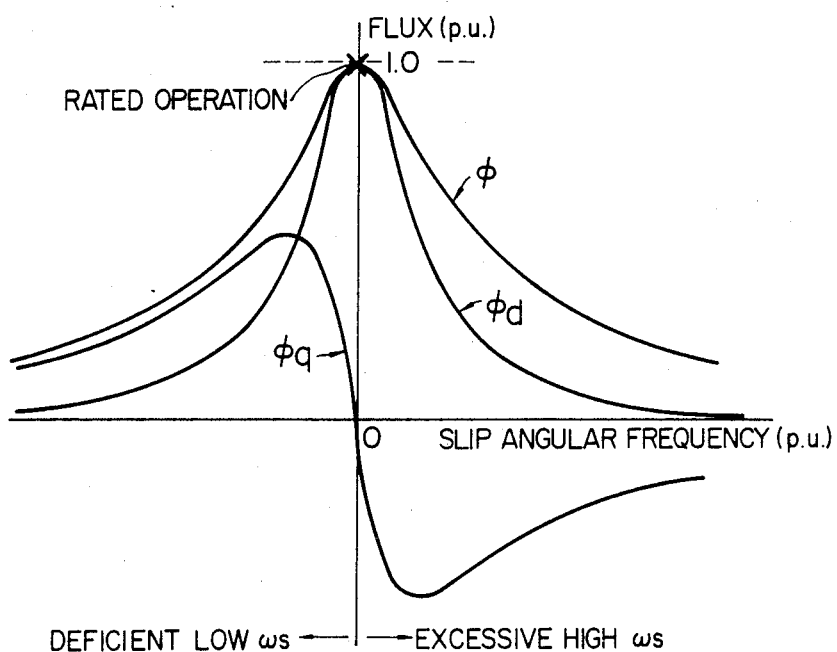
Figure 2:
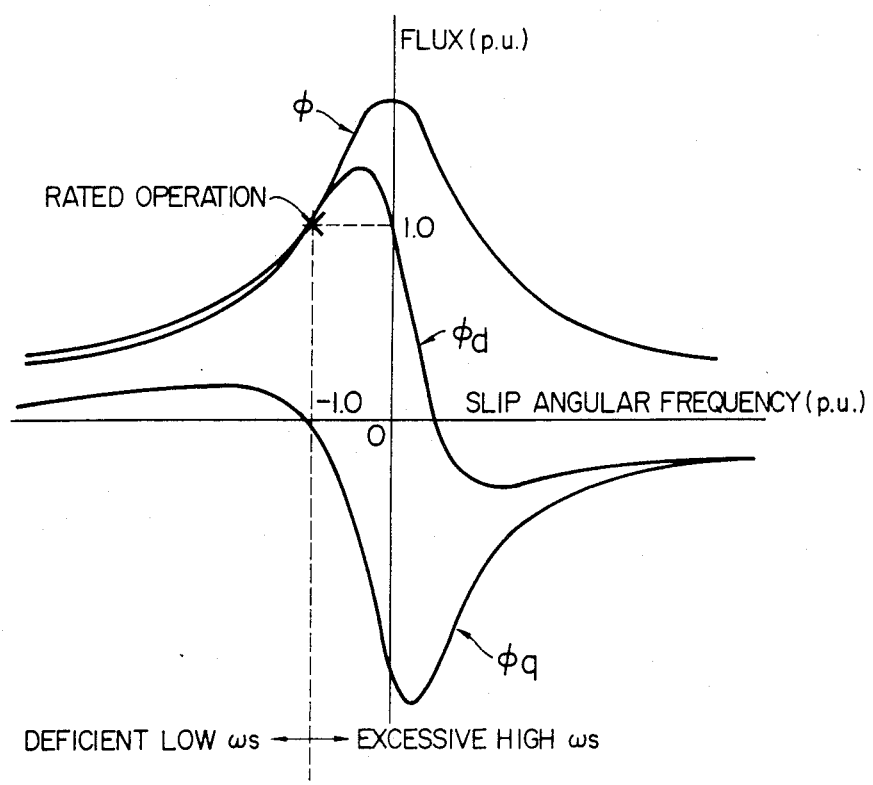

This operation will further be described referring to FIG. 2.

FIG. 2 illustrates a variation of a motor flux with respect to a slip frequency on the assumption that the current command signals $i_m^*$ and $i_t^*$ are fixed. $\phi_d$ and $\phi_q$ are the d- and q-axis magnetic flux components, respectively. FIG. 2(a) illustrates the flux variation when the torque current command signal $i_t^*$ takes a positive rated value. FIG. 2(b) illustrates the flux variation when the command signal $i_t^*$ takes a negative rated value.

In FIG. 2(a), an x point marked as X is a reference operating point for satisfying $\phi_d = \phi_2$ (reference value) and $\phi_d = 0$. When the slip angular frequency $\omega_s$ shifts from the operating point, $\phi_q = 0$, and the polarity of the voltage changes with respect to the reference operating point. In this case, the operating point settles down at the reference operating point by correcting the slip frequency $\omega_s$ according to $\phi_q$ in a manner that when $\phi_q > 0$, the primary frequency $f_1$ is increased and when $\phi_q < 0$, it is decreased. In this way, the motor speed control circuit can be operated so as to satisfy the equation (2). The same thing is true for the cases of FIGS. 2(b) and 2(c).

The operation principle of the equation (2) is as described above. The circuit operation of the motor control circuit of FIG. 1 will be described.

The voltage component detectors 7 and 8 detected the two axes components of the motor voltage, viz. a 90° phase-shifted component $e_q$ and an in-phase component $e_d$ with respect to the phase reference signal of the exciting current, in accordance with the following determinant.

$$\begin{bmatrix} e_d \\ e_q \end{bmatrix} = \begin{bmatrix} \cos \omega_1 t & \sin \omega_1 t \\ -\sin \omega_1 t & \cos \omega_1 t \end{bmatrix} \begin{bmatrix} V_\alpha \\ V_\beta \end{bmatrix} \quad (11)$$

where
$$V_\alpha = V u$$

$$V_\beta = \frac{1}{\sqrt{3}} (V_v - V_w)$$

$e_d$ = output signal of the voltage component detector 8

$e_q$ = output signal of the voltage component detector 7

Vu to Vw = phase voltages of the motor

The above operation can easily be realized using a combination of a multiplier and an adder, for example.

The voltage detected signals $e_d$ and $e_q$ are related to the magnetic flux components $\phi_d$ and $\phi_q$ in the following manner, if the influence by the leak impedance drop in the induction motor 2 is neglected.

$$\left. \begin{array}{l} e_d = -\omega_1 \phi_q \\ e_q = \omega_1 \phi_d \end{array} \right\} \quad (12)$$

The q-axis flux component $\phi_q$ is detected on the basis of the d-axis voltage signal $e_d$. The voltage signal $e_d$, together with the output signal from the change rate limiter 4, is applied to the adder 9. When the d-axis voltage component $e_d$ is negative ($\phi_q > 0$), the output signal of the adder 9 is large, that is, the addition is performed with the polarity providing an increase of the output frequency. In this way, the primary frequency $f_1$ is controlled so that the d-axis voltage component $e_d$ keeps 0 ($\phi_d = 0$) at all times. Therefore, the slip angular frequency $\omega_s$ is controlled at the value of the reference operating point x.

The q-axis voltage component (induced electromotive force) $e_q$ is proportional to the d-axis flux component $\phi_d$ and the angular frequency $\omega_1$, as given by the equation (12). Since the d-axis flux component $\phi_d$ at the reference operation point x is proportional to the exciting current command signal $i_m^*$, the d-axis flux component $\phi_d$ is kept at a fixed value if the exciting current command signal $i_m^*$ is fixed. Consequently, the q-axis voltage component $e_q$ is proportional to the angular frequency $\omega_1$.

Since the angular frequency $\omega_1$ and the electrical rotating angular speed $\omega_r$ are related by the following equation, the angular frequency $\omega_1$ and $\omega_r$ are approximately equal to each other when $\omega_r \gg \omega_s$.

$$\omega_1 = \omega_r + \omega_s \quad (13)$$

Therefore, it is seen that the rotating speed of the motor can be controlled according to the command of rotating speed in a manner that the speed command signal from the change rate limiter 4 is algebraically coupled with the q-axis voltage component $e_q$, and the torque current command signal $i_t^*$ is changed using a difference between them.

An arrangement of the circuit of FIG. 1 is shown in FIG. 3. Like reference numerals are used for designating like or equivalent portions in FIG. 1. The explanation of those portions will be omitted for simplicity. In FIG. 3, a voltage difference amplifier 17 amplifies a difference between a frequency command signal to be given later and the voltage component detected signal. A polarity checker 18 checks the polarity of the output signal from the voltage component detector 8. A comparator 19 produces an output signal when the output signal of the voltage difference amplifier 17 is above a predetermined value. A memory circuit 20 samples or fetches the output signal of the polarity checker 18 when the output signal of the comparator 19 is at low level, and holds the signal previously sampled when the comparator 19 produces a high level signal. A switch circuit 21 produces a signal with positive or negative polarity according to the output signal of the memory circuit 20 only when the comparator 19 produces a high level signal. An adder 9 adds together the output signals of the voltage component detector 8, the change rate limiter 4 and the switch circuit 21 to produce a speed operation signal. A slip frequency command circuit 22 produces a slip frequency command signal on the basis of the output signal of the amplifier 5. An adder 23 adds the speed operation signal and the slip frequency command signal to produce a frequency command signal. An adder 24 adds an exciting current command signal and the output signal of the voltage difference amplifier 17. A multiplier 25 multiplies the output signal of the adder 24 and one of the output signals of the oscillator 10 to produce an exciting current component command pattern signal (sinusoidal signal) of the primary current of the motor. A multiplier 26 multiplies the output signal (torque component command signal) of the comparator 15 and the other output signal of the oscillator 10 to produce a torque component command pattern signal (sinusoidal signal) of the primary current. An adder 27 vector adds together both the pattern signals to produce an output current command pattern signal of the PWM inverter 1. Actually, three sets of those functional components 14, 15, 16, 25, 26 and 27 are provided corresponding to the number of the inverter output phases; however, the other two sets of those components are omitted for simplicity.

The actual operation of the circuit of FIG. 3 will be described. The operation principle of this circuit is as described referring to FIG. 2 in the explanation of the circuit of FIG. 1.

A circuit operation in which the primary current is controlled according to the equations (1) and (3), will first be given. The oscillator 10 produces two phases of sinusoidal signals with a frequency proportional to a frequency command signal to be described in detail later. These signals are phase-shifted from each other by 90°, and are used as the phase references for the command patterns of the current components.

The above operation is executed in the multipliers 25 and 26, and the adder 27 to produce a current command pattern signal $i_1^*$ for commanding an instantaneous value of the inverter output current. A mathmetical expression of this is $$i_1^* = i_{1\alpha}^* + i_{1\beta}^* \quad (14)$$

$$= \sqrt{i_m^{*2} + i_\tau^{*2}} \cos(\omega_1 t + \theta)$$

In the above equation, $$i_{1\alpha}^* = i_m'^* \cos \omega_1 t$$

where
$i_m'^*$: the output signal of the adder 24
$i_{1\alpha}^*$: output signal of the multiplier 25

$$i_{1\beta}^* = -i_\tau^* \sin \omega_1 t$$

$i_\tau^*$: torque command signal (output signal of the amplifier 5)
$i_{1\beta}^*$: output signal of the multiplier 26

$$\theta = \tan^{-1} \frac{i_\tau^*}{i_m'^*}$$

$\omega_1$: primary angular frequency (output angular frequency of the oscillator 10).

The output current of the PWM inverter 1 is controlled under control of the comparator 15 with a hysteresis characteristic so as to be proportional to this current command pattern signal. By controlling the $i_1 d$ proportional to $i'_m{}^*$ (normally identical with the exciting current command signal $i_m{}^*$) and the $i_1 q$ proportional to the torque command signal $i_\tau{}^*$, the equations (1) and (3) are satisfied.

How this speed control circuit satisfies the equation (2) will now be described. Rearranging the equation (2), we have the equation (2)'. This equation indicates that if the slip angular frequency $\omega_s$ is so controlled as to be proportional to the $i_1 q$, the flux $\phi$ is constant.

$$\phi = \frac{M}{T_2} \cdot \frac{i_{1q}}{\omega_s} \quad (2)'$$

where M is a primary - secondary mutual inductance. Therefore, if the primary frequency is so controlled that the flux $\phi$ is always constant, the equation (2) is satisfied. A change of the flux can be detected as a change in the induced electromotive force. Accordingly, the flux $\phi$ can be controlled to always be constant by controlling the primary frequency according to a change of the induced electromotive force. This flux fixing control is as described referring to FIG. 2.

When the $i_\tau{}^*$ is large (heavy load) and the absolute value of the slip frequency is large, $|\phi_q|$ tends to be extremely small, and a gain of $\Delta\phi_q/\Delta\omega_s$ is decreased. For this reason, the above control is frequently encounters difficulty. The reason for the decrease of $|\phi_q|$ is that the flux decreases due to the increase of the frequency $f_s$. To cope with this, the following control is employed.

The d-axis flux component $\phi_d$ and the q-axis flux component $\phi_q$, in a stationary state, are given by $$\phi_d = (\omega_s T_2 \phi_q + M i_{1d}) \quad (15)$$

$$\phi_q = (-\omega_s T_2 \phi_d + M i_{1q}) \quad (16)$$

The q-axis flux component $\phi_q$ is zero at the reference operating point, but varies between positive and negative polarity with respect to the reference operating point, with a change of the slip angular frequency $\omega_s$.

The gain ($\Delta\phi_q/\Delta\omega_s$) proportional to $\phi_d$. The reason why it is small when $\phi_q < 0$ is that the d-axis flux component $\phi_d$ decreases. Therefore, if the d-axis flux component $\phi_d$ is kept contant, the above gain problem is solved. This characteristic is illustrated in FIGS. 4(a) and 4(b). The d-axis flux component $\phi_d$ changes with the d-axis primary current component $i_1 d$, as indicated by the equation (15). Therefore, the d-axis flux component $\phi_d$ can be kept at the rated value in such a way that the flux corresponding to the d-axis flux component $\phi_d$ is detected and the d-axis primary current component $i_1 d$ is controlled depending on a deviation of the flux from the rate value. In this way, the gain can be prevented from decreasing, always keeping the flux constant. The above is the principle of the flux fixing control.

In this way, in the range where the d-axis flux component $\phi_d$ is decreased between the rated value (1.0 p.u.) in FIG. 2, the d-axis primary current component $i_1 d$ is increased. At this time, the output current of the inverter is limited so as not to exceed a tolerance due to the increment of the d-axis primary current component $i_1 d$. Therefore, when the $\omega_s$ greatly shifts from the reference operating point, the d-axis flux component $\phi_d$ can not be kept constant, and $\Delta\phi_q/\phi\omega_s$ is again decreased, creating the gain decrease problem. For preventing this problem, when the d-axis primary current component $i_1 d$ is within a limit value, the polarity of the q-axis flux component $\phi_q$ is loaded into the memory. When the d-axis primary current component $i_1 d$ exceeds the limit value, the polarity of the q-axis primary current component $i_1 q$ is stored in the memory as it is. And the primary frequency $f_1$ is controlled depending on the polarity and according to the above relation. Therefore, even if the q-axis flux component $|\phi_q|$ is subsequently decreased to make the control difficult, $\omega_s$ can be corrected by the signal from the memory element, thereby eliminating the above mentioned problem.

FIG. 4(b) illustrates the case when $i_\tau{}^*$ is zero (no load). In the figure, a point marked as X is the reference operating point. Also in this case, an automatic operation to automatically fix the operating point to the reference operating point can be attained by controlling the primary frequency $f_1$ by the d-axis flux component $\phi_d$ in a similar manner to the previous one. FIG. 4(c) illustrates the case when the $i_\tau{}^*$ takes a negative rated value (the torque has a negative rated value). Also in this case, the intentional operation is attainable by the same control method.

In this way, the flux is always kept constant, satisfying the relations (2) and (2)'. The relations shown in FIG. 4 are common for both the forward and reverse running of the motor. Therefore, the same control system can be applied for both the forward and reverse running, and the normal motor running and the regenerative running (torque positively and negatively operates for the rotating direction of the motor). Incidentally, in case that the voltage component detected is dissolved into two axial components to run the motor in the reverse direction, the output polarity of the detected voltage must be inverted for the forward run of the motor.

The explanation to follow is how the above control is performed in the circuit of FIG. 3.

The voltage component detector 7 and the voltage component detector 8 detect the two axial components of the motor voltage, i.e. the 90° phase shifted voltage component and the in-phase voltage component with respect to the exciting current phase reference, according to the following relations.

$$\begin{bmatrix} e_d \\ e_q \end{bmatrix} = \begin{bmatrix} \cos\omega_1 t & \sin\omega_1 t \\ -\sin\omega_1 t & \cos\omega_1 t \end{bmatrix} \begin{bmatrix} V_{1\alpha} \\ V_{1\beta} \end{bmatrix} \quad (17)$$

$$\left.\begin{aligned} V_{1\alpha} &= V_U \\ V_{1\beta} &= \frac{1}{\sqrt{3}}(V_v - V_W) \end{aligned}\right\} \quad (18)$$

where $e_d$: output signal of the voltage component detector 8
$e_q$: output signal of the detector 7 $V_U$ to $V_W$: phase voltages of the motor $\left.\begin{aligned} \cos\omega_1 t \\ \sin\omega_1 t \end{aligned}\right\}$ output signals of the oscillator 10, $\cos\omega_1 t$ is the exciting current phase reference of the U-phase It is apparent that the above operation can be executed by using a combination of a multiplier and an adder.

If the influence by the leak impendance drop of the motor is neglected, the d-axis voltage component $e_d$ and q-axis voltage component $e_q$ are respectively related to the d-axis flux component $\phi_d$ and the q-axis flux component $\phi_q$ as indicated below.

$$\left.\begin{aligned} e_d &= -\omega_1 \phi_q \\ e_q &= \omega_1 \phi_d \end{aligned}\right\} \quad (19)$$

Thus, a signal corresponding to the q-axis flux component $\phi_q$ is obtained through the operation by detecting the terminal voltage component $e_d$ of the induction motor parallel to the exciting current vector component. Another signal corresponding to the flux d-axis flux component $\phi_d$ is obtained through the operation by detecting the q-axis voltage component $e_q$ orthogonal to the exciting current vector.

The output signal from the detector 8, together with the output signals of the change rate limiter 4 and the switch circuit 21, is applied to the adder 9. At this time, if the $e_d$ is negative ($\phi_q=0$), those signals are added together with the polarity providing an increase of the output signal of the adder 9. The output signal is added to the slip frequency command signal in the adder 23. The output frequency $f_1$ of the PWM inverter 1 is controlled so as to be proportional to the output signal (frequency command signal) of the adder.

In this way, the frequency $f_1$ is controlled according to the above-mentioned principle so that $e_d=0$ ($\phi_q=0$). At this time, the output signal from the adder 9 serves as a speed operation signal. The reason why the adder output signal serves as the speed operation signal will be seen from the following equations, since the slip frequency command signal is a command signal with a reference slip frequency predetermined by the torque command signal from the speed difference amplifier 5.

$$\left.\begin{aligned} f_s^* + f_r^* &= f_1 \text{ (inverter side)} \\ f_s + f_r &= f_1 \text{ (motor side)} \end{aligned}\right\} \quad (20)$$

where $f_s^*$ and $f_s$: command value and an actual value of the slip frequency
$f_r^*$ and $f_r$: operated value and an actual value of the motor rotating frequency
$f_1$: inverter output frequency or a motor primary frequency As seen from the above equations, the inverter output frequency $f_1$ is controlled by the sum of the slip frequency command value $f_s^*$ and the output signal of the adder 9. The motor primary frequency is given as the sum of the actual value $f_s$ of the slip frequency and the actual value $f_r$ of the motor rotating frequency. Therefore, $f_r^*=f_r$ when taking account of the facts that $f_s^*=f_s$ and the inverter output frequency is identical with the primary frequency. As described above, the output signal of the adder 9 serves as the speed operation signal.

The slip frequency command circuit 22 is not essential to the present invention, because $f_s$ is controlled to be set at the reference operating point irrespective of the presence or not of the slip frequency command. In this case, no problem is created in the speed control response performance. In this case, however, since the relation $f_r^*=f_r$ does not hold, the speed control accuracy is degraded. In the range where $f_s/f_r$ is satisfactorily small, its influence by the control accuracy degradation is not large, the control system with no slip frequency command circuit 22 under discussion is effectively applicable for the use with a not so strict requirement for the speed control accuracy.

In the above-mentioned embodiment, the speed command signal is applied to the adder 9 through the change rate limiter 4 for limiting a variation of the $e_d$ within a narrow range. This is not essential to the present invention, however. The operations of the circuits 18, 20 and 21 will be described.

The output signal $e_q$ of the voltage component detector 7 is coupled with the output signal (frequency command signal) of the adder 23 and the coupled one is applied to the voltage difference amplifier 17. At this time, the frequency command signal is used as a command signal of the $e_q$. As a result, a signal related to the variation of the $\phi_d$ is produced from the voltage difference amplifier 17. This signal and the exciting current command signal from the exciting current command circuit 11 are added together in the adder 24. The d-axis primary current component $i_{1d}$ is controlled proportional to the result of the addition. As a result, the d-axis flux component $\phi_d$ is controlled to be constant. The reason why the d-axis flux component $\phi_d$ is controlled to be constant is as described above. When the slip angular frequency $\omega_s$ shifts from the reference operating point, the voltage difference amplifier 17 produces a signal. This signal, however, is returned to zero when the operating point is returned to the reference operating point as the result of the flux fixing control as mentioned above. Thus, the d-axis flux component $\phi_d$ in a normal state is controlled proportional to the exciting current command.

As already described in the explanation of the basic idea of the present invention, the increment of the d-axis primary current component $i_{1d}$ must be limited allowing for a tolerance of the output current of the inverter. For this reason, the voltage difference amplifier 17 is provided with the output current limiter. The comparator 19 is for checking whether or not the output signal reaches a limit value. The output signal representing such is applied from the comparator 19 to the memory circuit 20 and the switch circuit 21. The memory circuit 20 fetches a signal based on the polarity of the $e_d$ delivered from the polarity checker 18, and stores the fetched signal when the comparator 19 produces a signal. The switch circuit 21 produces a positive or negative signal according to the output signal of the memory circuit 20. With this signal, the frequency $f_1$ is changed so that the operating point is returned to the reference point. The necessity of those circuits and the like are as described in the explanation of the principle of the control system.

As described above, the speed control system operates so that the equations (1) to (3) always hold, thereby enabling a high speed response in the motor speed control.

As described above, present invention provides a control method which can effect the speed control with a high speed response without the speed detector.

The embodiment of FIG. 1 employs a method that the q-axis voltage component $e_q$ is detected, the exciting current command signal $i_m^*$ is corrected according to a deviation from the command value to change the d-axis primary current component $i_1d$, whereby the d-axis flux component $\phi_d$ is controlled to be constant. As seen from FIG. 2, the flux $\phi$ and the d-axis flux component $\phi_d$ are similar to each other in the characteristic. Therefore, substantially the effect can be attained if the $\phi$ in place of d-axis flux component $\phi_d$ is controlled to be constant. In this control system, the detected signal of an amplitude of the motor voltage, in place of the output signal of the voltage component detector 7, is applied to the voltage difference amplifier 17, unlike the control circuit FIG. 3.

Turning now to FIG. 5, there is shown another embodiment of a motor speed control system according to the present invention.

In the speed control system FIG. 1, the exciting current command signal $i_m^*$ is set by the exciting current command circuit 11. For setting the exciting current command signal $i_m^*$, it is necessary to perform an initial adjustment so that the motor voltage has a predetermined value. In the embodiment of FIG. 5, there is eliminated such initial adjustment.

In FIG. 5, like reference symbols are used for like or equivalent portions in FIG. 1, and hence no explanation of those portions will be given. An amplifier 28 produces a correction signal $\Delta i_m$ for the exciting current command signal according to a difference between the output signal (proportional to the $f_1$) of the adder 9 and the q-axis voltage component $e_q$. A reference numeral 29 designates an exciting current setting circuit for producing a reference value of the exciting current command. An adder 30 adds a reference value $i_m^{**}$ of the exciting current command signal and the correction value $\Delta i_m$ to produce the exciting current command signal $i_m^*$.

The q-axis voltage component $e_q$ ($\propto \phi_d$ is proportional to the exciting current command signal $i_m^*$. With this relation, if the q-axis voltage component $e_q$ is smaller than a predetermined value, the exciting current command signal $i_m^*$ is increased. In the reverse case, it is decreased. In this way, the q-axis voltage component $e_q$ can be controlled to be a predetermined value. If a correction signal $i_m$ is formed, by the amplifier 28, on the basis of a difference between the output signal of the adder 9 and the q-axis voltage component $e_q$, and the exciting current command signal $i_m^*$ is corrected to have the following relation.

$$k_1 \omega_1 - e_q = 0 \tag{21}$$

or $$e_q/\omega_1 = k_1 \tag{22}$$

where $k_1$: proportional coefficient.

As seen from the above equation, the d-axis flux component $\phi_d$ ($=e_q/\omega_1$) may be kept constant, so that no initial adjustment of the exciting current command signal $i_m^*$ is required, unlike the embodiment of FIG. 1. The remaining operation of the embodiment of FIG. 5 is exactly the same as that of FIG. 1.

While the above three embodiments is based on $\omega_1 = \omega_r$, an embodiment shown in FIG. 6 is designed so as to correct a speed control error of only the slip angular frequency $\omega_s$.

The difference of the embodiment of FIG. 6 from that of FIG. 1 is only the additional use of a slip frequency correction circuit 31 and an adder 32.

The slip angular frequency $\omega_s$ is given by the equation (2) when the secondary flux $\phi_2$ is controlled to be constant. As seen from the equation (2), if the secondary time constant $T_2$ and the d-axis primary current component $i_1d$ are constant, the slip angular frequency $\omega_s$ can be obtained from the q-axis primary current component $i_{1q}$. The slip frequency correction circuit 31 obtains a slip angular frequency $\omega_s$ from the torque current command signal $i_1^*$ and adds it to the speed command signal of the speed command circuit 3, and uses the result of the addition as the primary frequency command signal.

With such an arrangement, an accurate control is possible so that the rotating speed of the induction motor 2 is coincident with the speed command signal of the speed command circuit 3.

The changing of the exciting current command signal $i_m^*$ is easily realized by using an angular frequency correction circuit 33 for obtaining the slip angular frequency $\omega_s$ according to the equation (2), using the torque current command signal $i_t^*$ and the exciting current command signal $i_m^*$.

The slip angular frequency $\omega_s$ determined by the angular frequency correction circuit 33 can be added either to the positive terminal of the amplifier 5 in positive polarity of $\omega_s$ or to the negative terminal in negative polarity.

As seen from the foregoing, the present invention detects the orthogonal two axial components of the motor voltage and controls the primary current on the basis of the voltage component, thereby securing a stable, high accuracy vector motor speed control, unlike the prior art which detects a flux component by means of an integrator for the speed control signal.

While the above embodiments are all applied to the PWM inverter, the present invention is applicable for any device if it allows the output frequency and the output voltage (current) to be controllable.

It should be understood that a digital control method using a microprocessor, for example, based on the technical idea as mentioned above is also involved in the present invention.

I claim:

1. A vector control method for induction motor for independently controlling a torque current component and an exciting current component of the primary current supplied to an induction motor through the control of an amplitude and a frequency of the primary current, comprising the steps of:

detecting a motor voltage of said induction motor;

resolving said motor voltage into a vector component $e_d$ parallel with an exciting current component of the primary current and a vector component $e_q$ orthogonal to said exciting current component vector; and controlling a frequency of said primary current so that said vector component $e_d$ of said motor voltage is zeroed, while at the same time controlling said primary current corresponding to a difference between said vector component $e_q$ and a speed command signal, thereby to control the speed of said induction motor.

2. A vector control method according to claim 1, further comprising the step of detecting a difference between said vector component $e_q$ and a command value of said vector component $e_q$, thereby to automatically set said vector component $e_q$ equally to said command value by controlling said exciting current component.

3. A vector control method according to claim 1, further comprising the step of adding a signal component corresponding to a slip frequency to said speed command signal to provide another speed command signal.

4. A vector control method according to claim 1, further comprising the step of adding a signal component corresponding to a slip frequency in negative polarity to a negative terminal of a speed difference amplifier.

* * * * *